(12) United States Patent
Covannon et al.

(10) Patent No.: US 7,180,529 B2
(45) Date of Patent: Feb. 20, 2007

(54) IMMERSIVE IMAGE VIEWING SYSTEM AND METHOD

(75) Inventors: Edward Covannon, Ontario, NY (US); Michael E. Miller, Rochester, NY (US); Thomas M. Stephany, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 133 days.

(21) Appl. No.: 10/326,638

(22) Filed: Dec. 19, 2002

(65) Prior Publication Data

US 2004/0119729 A1    Jun. 24, 2004

(51) Int. Cl.
*G09G 5/10* (2006.01)
(52) U.S. Cl. .................................... 345/690
(58) Field of Classification Search ........ 345/418–427, 345/716–726, 737–744, 848, 854, 690, 646, 345/580–590, 4, 8, 1.1; 359/474, 477, 13, 359/630; 382/103; 348/42–59, 222.1, 239; 353/94
See application file for complete search history.

(56) References Cited

U.S. PATENT DOCUMENTS

| | | | |
|---|---|---|---|
| 3,113,180 A | | 12/1963 | Bingley et al. |
| 4,513,317 A | | 4/1985 | Ruoff, Jr. |
| 5,422,653 A | | 6/1995 | Maguire, Jr. |
| 5,499,136 A | * | 3/1996 | Jones ........................... 359/474 |
| 5,841,439 A | * | 11/1998 | Pose et al. .................. 345/418 |
| 6,050,717 A | * | 4/2000 | Kosugi et al. ................. 700/17 |
| 6,124,954 A | * | 9/2000 | Popovich et al. ............. 359/13 |
| 6,147,709 A | | 11/2000 | Martin et al. |
| 6,231,185 B1 | * | 5/2001 | Pipa ............................ 351/208 |
| 6,369,952 B1 | * | 4/2002 | Rallison et al. .............. 359/630 |
| 6,522,325 B1 | * | 2/2003 | Sorokin et al. .............. 345/427 |
| 6,535,241 B1 | * | 3/2003 | McDowall et al. ........... 348/51 |
| 6,593,957 B1 | * | 7/2003 | Christie ........................ 348/42 |
| 6,669,346 B2 | * | 12/2003 | Metcalf ........................ 353/94 |
| 6,752,498 B2 | * | 6/2004 | Covannon et al. .......... 351/240 |
| 6,778,226 B1 | | 8/2004 | Eshelman et al. |
| 6,956,576 B1 | * | 10/2005 | Deering et al. .............. 345/475 |
| 6,985,158 B2 | * | 1/2006 | Miller et al. ................. 345/598 |
| 7,071,897 B2 | * | 7/2006 | Bronson ........................ 345/7 |
| 7,075,553 B2 | * | 7/2006 | Miller et al. ................. 345/598 |
| 2001/0040671 A1 | * | 11/2001 | Metcalf ........................ 353/94 |
| 2002/0113912 A1 | * | 8/2002 | Wright et al. ................. 349/13 |
| 2003/0067539 A1 | * | 4/2003 | Doerfel et al. ................ 348/51 |
| 2003/0076423 A1 | * | 4/2003 | Dolgoff .................... 348/222.1 |
| 2004/0027451 A1 | * | 2/2004 | Baker ........................... 348/46 |
| 2004/0041924 A1 | * | 3/2004 | White et al. ................. 348/239 |
| 2004/0105573 A1 | * | 6/2004 | Neumann et al. ........... 382/103 |
| 2004/0169657 A1 | * | 9/2004 | Morgan et al. ............. 345/501 |
| 2004/0240777 A1 | * | 12/2004 | Woodgate et al. ............ 385/16 |
| 2004/0257384 A1 | * | 12/2004 | Park et al. ................... 345/646 |
| 2005/0041208 A1 | * | 2/2005 | Winterbotham ............. 351/203 |

* cited by examiner

Primary Examiner—Bipin Shalwala
Assistant Examiner—Prabodh Dharia
(74) Attorney, Agent, or Firm—Susan L. Parulski (57) ABSTRACT

An immersive image viewing method comprises the steps of: displaying a scene on a first viewing area, the scene comprised of at least one image; displaying a lighting environment on a second viewing area separate from the first viewing area, the first and second viewing areas defining an immersive viewing environment for an observer for viewing the scene; and coordinating the simultaneous displaying of the scene and the lighting environment on the first and second viewing areas, respectively, within the immersive viewing environment to generate an immersive viewing scene.

14 Claims, 4 Drawing Sheets

IMMERSIVE IMAGE VIEWING SYSTEM AND METHOD

FIELD OF THE INVENTION

The invention relates generally to the field of display systems and in particular an immersive viewing system. More specifically, the invention relates to a system for creating an immersive environment for viewing displays.

BACKGROUND OF THE INVENTION

Viewing a large image can enhance the sense of immersiveness (i.e., the sense or feeling of "being there"). For example, the entertainment industry provides panoramic display technologies such as Cinemascope and IMAX wherein the image is much larger than the observer viewing the image. However, the increase in the image size relative to the observer comes at a high cost. That is, a small increase in the diagonal dimension of the image (and subsequent modest improvement of the ratio of the image to the viewer's overall field of view) results in a large increase in the area of the image which, in turn, produces a large increase in the cost of capture of the image, image handling, memory, computer processing, transmission, and projection costs.

Accordingly, there is a need to be able to enhance the sense of immersiveness without significantly increasing the cost of the capture-to-delivery chain. More particularly, there is a need to reduce the intrusion of the outside world upon the viewer's field of view of a displayed image so as to not contradict or detract from the displayed image.

Common means of excluding the outside world from a viewing experience are special venue entertainments, an example of which is amusement park rides. Such special venue entertainments control the viewer/environment relationship to enhance a sense of immersion, but are limited in the kinds of content they can enhance by the physical inflexibility or cost of altering the environment to suit widely different content needs.

Therefore, there exists a need for a system/method to reduce the intrusion of the environment for a single venue, and also to provide a means to reduce this intrusion dynamically such that multiple immersive experiences can be delivered cost effectively in a single venue, such as a movie theater. Such a viewing system and method should enhance the sense of immersiveness, be employable in existing theaters with no/minimal retrofitting, be adaptable to the individual characteristics of theaters, be employable with existing movies and other visual content to enhance the viewing experience on an individual basis, and/or include means of comparing and correcting the output of the system relative to a reference model.

SUMMARY OF THE INVENTION

An object of the present invention is to provide a viewing system and method which enhance the sense of immersiveness.

Another object of the present invention is to provide such a viewing system and method which can be employed in existing theaters with no/minimal retrofitting.

Another object of the present invention is to provide such a viewing system and method which can adapt to the individual characteristics of theaters.

A further object of the present invention is to provide such a viewing system and method which can be employed with existing movies and other visual content and will enhance the viewing experience on an individual basis.

A further object of the present invention is to provide such a viewing system and method that includes means of comparing and correcting the output of the system relative to a reference model.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided an immersive image viewing system. The system comprises: a display device for displaying a scene on a first viewing area, the scene comprised of at least one image; means for displaying and modifying a lighting environment on a second viewing area separate from the first viewing area, the first and second viewing areas defining an immersive viewing environment for an observer for viewing the scene; and means for coordinating the displaying of the scene and the lighting environment on the first and second viewing areas, respectively, within the immersive viewing environment to generate an immersive viewing scene.

According to another aspect of the invention, there is provided a method of generating an immersive viewing scene. The method comprises the steps of: displaying a scene on a first viewing area, the scene comprised of at least one image; displaying a lighting environment on a second viewing area separate from the first viewing area, the first and second viewing areas defining an immersive viewing environment for an observer for viewing the scene; and coordinating the simultaneous displaying of the scene and the lighting environment on the first and second viewing areas, respectively, within the immersive viewing environment to generate an immersive viewing scene.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
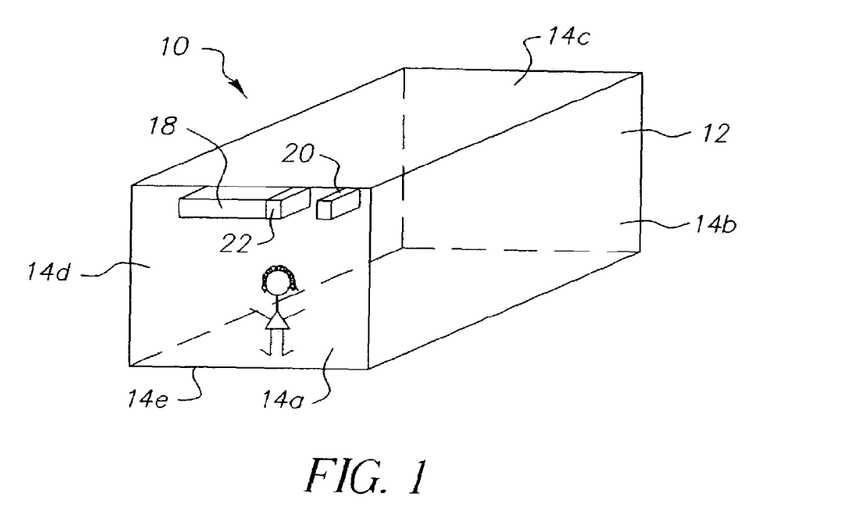
FIG. 1 shows an isometric view of an immersive viewing environment in accordance with the present invention.
Figure 2:
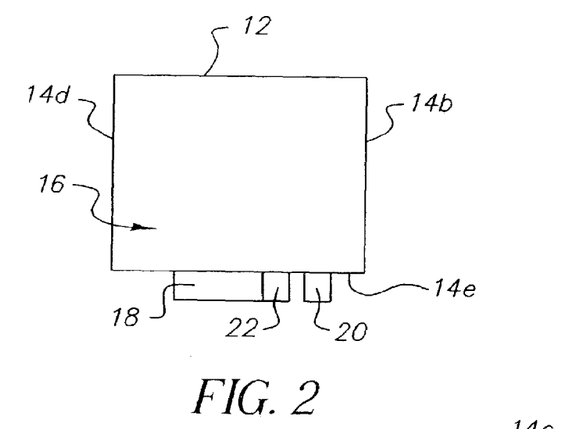
FIG. 2 shows a top view of the viewing environment of FIG. 1.
Figure 3:
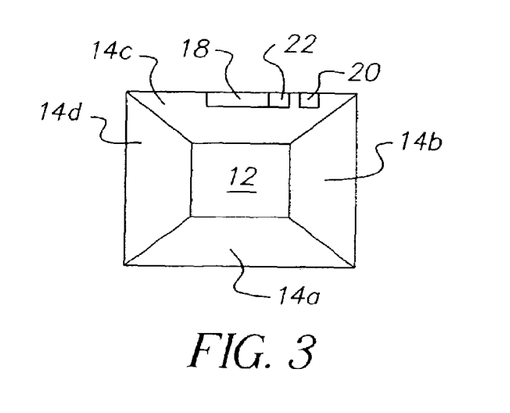
FIG. 3 shows a front view of the viewing environment of FIG. 1.

FIGS. 1–3 generally illustrate an immersive image viewing system 10 in accordance with the present invention for displaying a scene viewable by at least one observer in a viewing environment. The scene comprises at least one image, though typically, the scene will comprise a plurality of images, for example, a movie or the like.

The viewing environment comprises a plurality of viewing areas, including a first viewing area 12 and a second viewing area 14. First and second viewing areas 12, 14 can be, for example, a stationary wall, a screen, or the like. Together, first and second viewing areas 12, 14 define an area, hereinafter referred to as an immersive viewing environment 16, in which the observer can view the scene.

It is noted that the viewer can have motion/movement relative to first and second viewing areas 12, 14. As such, viewing areas 12, 14 are stationary with respect to some portion of the immersive viewing environment. For example, the viewer might be disposed on a motion stage or a movable chair. In another arrangement, both the viewing area(s) and the viewer might be disposed on the same or different motion stages. In a further arrangement, second viewing area 14 is a curtain, screen, door, ceiling panel, or the like intended to be moved prior, during or after the performance.

First and second viewing areas 12, 14 are separate and distinct areas. They can be adjacent, proximate, and/or opposite each other. Second viewing area 14 can be comprised of a single or plurality of sections. In FIG. 1, immersive viewing environment 16 comprises second viewing area 14 having five sections, specifically, sections 14$a$, 14$b$, 14$c$, 14$d$, and 14$e$. More particularly, second viewing area 14$a$ is shown as a floor or base of viewing environment 16; viewing areas 14$b$ and 14$d$ are the sides walls adjacent first viewing area 12; viewing area 14$c$ is the top wall (e.g., ceiling) of viewing environment 16; and viewing area 14$e$ is the side wall opposite first viewing area 12. In addition, there may be a viewing area comprised of a portion adjacent/proximate viewing area 12. For example, viewing area 12 might be a portion of a wall with a drapery on the wall surrounding viewing area 12.

Viewing system 10 includes a display device 18 that displays the scene on first viewing area 12 so as to be viewable by the observer. Accordingly, as is well known to those skilled in the art of equipping a theater, display device 18 can be a projection (front or rear projection) system, movie film projector, digital projector, or other display device, including, but not limited to, emissive devices such as a television or computer screen.

Viewing system 10 further includes means 20 for displaying and modifying a lighting environment on second viewing area 14. By lighting environment, Applicant is referring to the color (comprised of chroma (C), hue (H), and value (V)) of light that impinges second viewing area 14. The lighting environment can, but does not need to, include an image. That is, the lighting environment can include any combination of emissive and reflective lighting sources as well as the reflective filtering, and focusing elements themselves. As known to those skilled in the art of lighting, many different lighting effects can be produced by combining and controlling the luminance, color, form, diffusion, color temperature, movement, filtering, intensity, number of sources and directions from which the light appears. By affecting the lighting environment of second viewing area 14, the immersiveness of the scene displayed on first viewing area 12 is enhanced. That is, the display of the light (e.g., modifying and changing the lighting characteristics) can enhance the observer's sense of immersiveness, as will be described in more detail below.

Viewing system 10 further includes means 22 for coordinating the displaying of the scene (using display device 18) and the lighting environment on first and second viewing areas 12, 14, respectively (using means 20), within the immersive viewing environment to generate an immersive viewing scene. That is, the lighting environment is synchronized so as to be displayed/modified with a corresponding scene. Stated alternatively, means 22 coordinate the displaying of the scene and the lighting environment on first 12 and second 14 viewing areas, respectively, within immersive viewing environment 16 to generate an immersive viewing scene. As such, the lighting environment displayed on second viewing area 14 is coordinated for the particular scene displayed on first viewing area 12 to provide the observer with an immersive experience.

For example, envision a "Casablanca"-type or Humphrey Bogart-type movie having a scene in a café wherein a ceiling fan is slowly rotating overhead. This scene would be displayed on first viewing area 12 using display device 18. On second viewing area 14, means 20 would affect the lighting environment (i.e., modulate the chroma, hue, and value as well as the direction, motion, and form of light impinging second viewing area 14) to generate an effect of a ceiling fan slowly sweeping past a light. Such an effect may require light impinging on more than one second viewing area 14, for example, reflections and/or shadows of the ceiling fan may impinge on sections 14$c$, 14$b$, and 14$d$. Accordingly, an observer looking directly at second area 14 would view flashing lights. However, an observer viewing the scene displayed on first viewing area 12 (i.e., the observer is looking directly at the scene displayed on first viewing area 12) would have a sense of immersiveness resulting from the appropriate lighting environment being displayed on second viewing area 14. As such, the lighting environment displayed on second viewing area 14 does not detract from the displayed scene. Rather, the lighting environment enhances the immersiveness of the scene. Coordinating means 22 provides the synchronizing/referencing of the scene with the lighting environment so as to generate an immersive viewing scene.

Figure 4A:
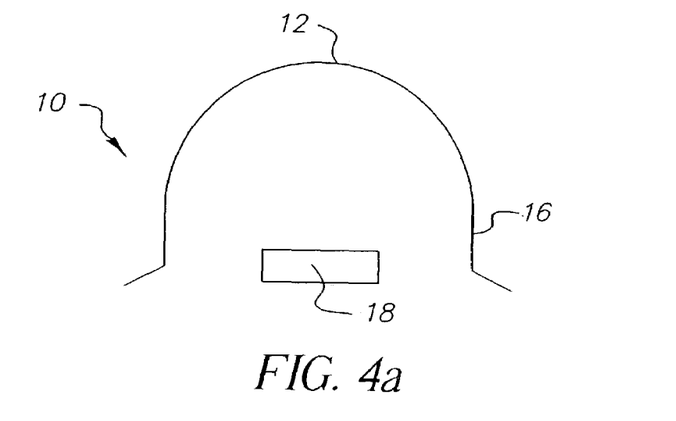
FIGS. 4a–4c shows generally, in a top view, alternate configurations of the viewing environment.
Figure 4B:
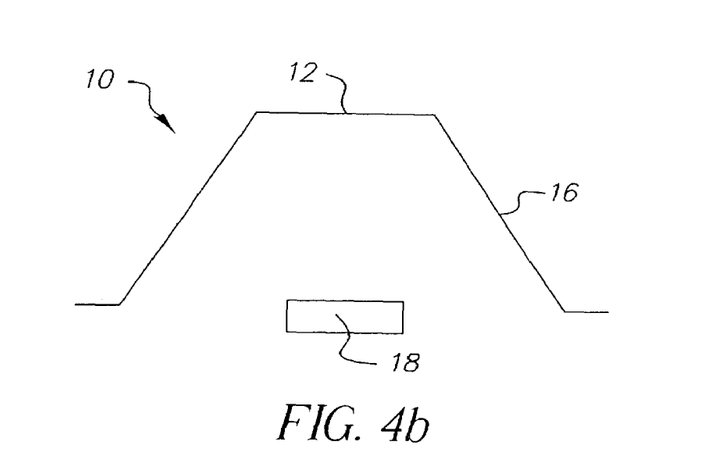
Figure 4C:
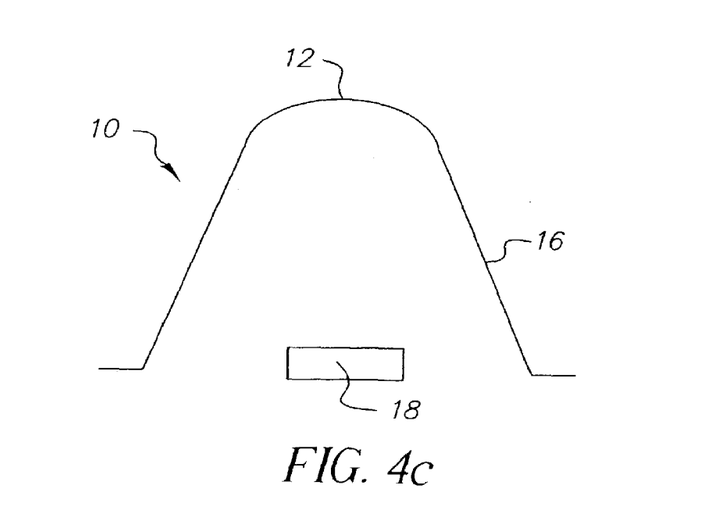

Viewing environment 16 shown in FIGS. 1–3 is illustrated as a room having a substantially orthogonal shape, such as a square or rectangular shape. However, viewing environment 16 can be an open or enclosed area. Further, viewing environment 16 can comprise alternative shapes, for example but not limited to, circular, oblong, and diamond shaped, as generally shown in FIGS. 4$a$–4$c$. Other configurations for viewing environment 16 may be known to those skilled in the art.

It is understood that the term "lighting environment" refers to any lighting effect which can be accomplished by modifying/modulating color (which is comprised of the elements of chroma (C), hue (H), and value (V)) and other aspects of light to effect the onset, filtering, movement, intensity, direction, form, aperture/focus, distribution and type of lights or the light reflectance or transmissive surfaces of viewing environment 16. But such modifications are greater than the modification of any single light source since the lighting environment is greater than the sum of its parts, which is the means by which immersiveness in the scene displayed on first viewing area 12 is enhanced. It is well known that the chroma, hue, and value are relative. A typical example of such perceptual relativity is when what appears gray when adjacent to something white, will appear white when disposed next to something darker gray. Further, the manner in which the lighting environment changes adds many important perceptual cues that modify the manner in which chroma, hue, and value are perceived. In addition, the focus of the lighting (e.g., direct, diffuse) imparts important perceptual cues. For example, simply darkening a theater is not equivalent to reproducing an enhancing environment.

Examples are now provided to illustrate how an immersive image viewing system 10 can provide perceptual cues in conjunction with an image displayed on first viewing area 12.

In a first example, a scene displayed on first viewing area 12 shows a hero running away from an explosion, with the hero and explosion being directed toward the viewer. In a theater employing the immersive image viewing system in accordance with the present invention, bright explosive bursts of light synchronized with the sound could be occurring in the rear (i.e., side wall 14e) of the theater, increasing in brightness and changing position along with the sound.

In a second example, a scene displayed on first viewing area 12 shows a child playing in the sand on a beach with clouds floating overhead and palm trees waving in the wind. Using the present invention, languid modulations of diffuse light can play upon the viewer in a manner suggestive of waving palms and passing clouds.

In many scenes, the camera view takes the viewer through regions of changing light, for example, past windows, through doorways, but where the environment changes only in response to the amount of light direction on first viewing area 12, which is often in contradiction to the ambient effects directed for the environment.

Coordinating means 22 are well known to those skilled in the art. For example, coordinating means 22 can be any processor or standardized synchronization system, such as used for movie, film and video to operate a standardized set of emissive and projective devices. For example, the Society of Motion Picture Engineers (SMPTE)/EBU (European Broadcast Union) have defined synchronization standards, such as the SMPTE/EBU longitudinal timecode (also know as LTC) and SMPTE Vertical Interval Time Code (VTIC). In addition, magnetically striped and electronic means have replaced the well-known method of the mechanical use of sprocket holes and visual patterns disposed on film for synchronizing sound with an image. Other forms typical of, but not limited to, standards for synchronizing time codes including (depending on the equipment) Musical Instrument Device Interface (MIDI) time code, Universal Time Code and SMPTE digital television standards. Indeed, the present invention is intended to employ any synchronization method with the addition of an additional track for the lighting environment. By an additional track, the present invention does not exclude hiding data for the lighting environment within other data, including the content data, or having the track stored on a storage device that is physically separate from (but synchronized to) the content storage device. A typical example of additional tracks of data combined with a display transmission system is the manner in which subtitling data is hidden within the blanking interval in a video signal. The information being synchronized with the scene/image is a digital description of the lighting environment itself in a standard format, rather than a set of particular device commands. For example, like an acoustical environment, means 20 converts/interprets the information into output appropriate to the equipment at a particular venue at the time of display/playback.

Accordingly, means 20 for displaying and modifying the lighting environment can be display device 18, means 22, or a separate device. Means 20 can be any equipment or collection of equipment adapted to interpret commands appropriate to the media and lighting environment. For example, means 20 might originate with a personal computer running lighting control software, such as that produced by SUNLITE. The personal computer can include a digital-to-analog conversion board (i.e., to drive an analog controller) or a purely digital output board, such as produced by PMC Products of Echotek or MotionNet. The output signal is then used in conjunction with physical lighting controllers capable of taking in the control data from the personal computer and converting it into changes to the power, direction, filtering, aperture or other aspects affecting a lighting device. This is typical of such product as controllers produced by Techni-Lux, Star Light and Magic, and Chase. Other systems typical of "show control" systems are systems produced by Anitech, Showcad, Triad, Prophet and Meidamation which produce or integrate one or more of the preceding components.

It is noted that the lighting environment displayed on second viewing area 14 can be constant (i.e., non-changing) though preferably, to promote immersiveness, the lighting environment on second viewing area 14 is changing.

Generating lighting effects are well known and are accomplished by those skilled in the art. Lighting effects are used, for example, during a live-drama to provide attention to a particular character on stage who is speaking. Lighting is also used for television commercials and television shows. Indeed, lighting is a fine art with a vast array of types, lights, shutters, gels, lenses, and reflectors. Recently, special venue entertainments, such as amusement park rides, have used lighting effects trained on the audience to enhance an amusement park ride. An example of such an amusement park ride is the Hollywood Tower of Terror. It employs lighting effects to place the riders in a mood appropriate to a ride that occurs at the end. Unlike the present invention, the lighting effects of amusement park rides are location oriented, fixed on a state or integrated in a physical space or ride, and are not designed to intended to flexibly change in response to a constantly changing selection of differing entertainments, such as occurs in a movie theater or with television.

The lighting environment can be generated using a variety of systems and methods. It can be extrapolated, new, or random.

In a first embodiment, the lighting environment can be extrapolated. For example, if the scene being displayed on first viewing area 12 is an existing scene (e.g., captured previously), the lighting environment can be extrapolated from the scene or developed separate from the scene. The movie "Casablanca" was filmed years ago. Therefore, to employ the immersive viewing system of the present invention, the lighting environment would be developed by extrapolating scenes from the movie. For example, as discussed above, for a café scene having a slowly rotating overhead fan, the lighting environment would provide peripheral flashes of light, as if the fan blades were sporadically blocking the overhead light.

In another example, the action takes place on a subway car passing through occasional brightly lit stations. As the scene takes the viewer visually past the each brightly lit station, the light of the passing station plays upon the viewer. In yet another scene, a giant flying saucer glides into position overhead, and the lighting environment darkens the viewing environment into gloom. Other moods can be developed such as altering the lighting environment in a manner emotionally or subconsciously different than what would be implied by the scene being displayed on first viewing area 12. For example, a sense of unease can be created by displaying a sunny scene on first viewing area 12 and displaying the lighting environment as low level light with a greenish caste when a supernatural event it going to take place.

In a second embodiment, if the scene being displayed on first viewing area 12 is new, then the lighting environment can be captured as the scene is being captured. For example, if the scene is being captured on film for display using display device 18, then the lighting environment can be captured simultaneously with the scene. An example of a device suitable for capturing the scene and the lighting environment is lightprobe developed by Dr. Paul Debevec (www.debevec.org). With this device, a camera captures the environmental lighting reflected in a polished hemisphere. The camera can further be modified or multiple cameras/lenses employed so that important data about the dynamic range of the lighting (e.g., useful in determining light sources from light reflected) can be captured at the same time. The digitized method of this capture constitutes at least one standard means of describing the lighting environment.

In a third embodiment, the lighting environment can be random. That is, the lighting environment enhances immersiveness, but is not extrapolated from the scene or acquired with the acquisition of the scene. For example, if the scene involved fireworks, the lighting environment can be random flashed of light. In another example, if the scene involves music from the 1950's, symbols or other icons associated with the 1950's could be displayed on second viewing area 14. Another example, might be a passionate love scene being displayed on first viewing area 12 wherein warm colors moving in a sensuous manner are displayed on second viewing area 14. Yet another example could be an underwater scene wherein the lighting environment on second viewing area 14 is a bluish green light randomly shifting in a manner suggestive (but not captured) of a wave, thereby causing patterns of light and dark.

In a preferred operation of viewing system 10, the observer is facing first viewing area 12. As such, second viewing are 14 is not viewed directly (i.e., it is viewed peripherally) by the observer. Accordingly, it is preferred that the scene displayed on first viewing area 12 is of a high resolution. Similarly, since second viewing area 14 is not viewed directly (i.e., the observer does not focus on second viewing area 14 in the preferred embodiment), the lighting environment does not need to be a high resolution image. Rather, the lighting environment can comprise a low resolution image, a low resolution light, or simply a collection of properly controlled lights. The peripheral effect enhances the immersiveness. The peripheral effect invokes certain perceptions, such as the perception of motion, by providing perceptual cues in areas of the human visual field that are especially sensitive to these cues. Beyond the peripheral effect, is the perceptual effect that enhances the immersiveness by perceiving a wholeness to the environment. For example, while a darkened theater is less likely to provide visual cues that are contradictory to the cues provided on the primary display than a lit static room, when employing the present invention, a theater environment can provide visual cues that enforce, enhance, undercut, or extend the influence of the content of the scene/image displayed on first viewing area 12 with the entire environment and with a range of conscious and subconscious cues.

Figure 5:
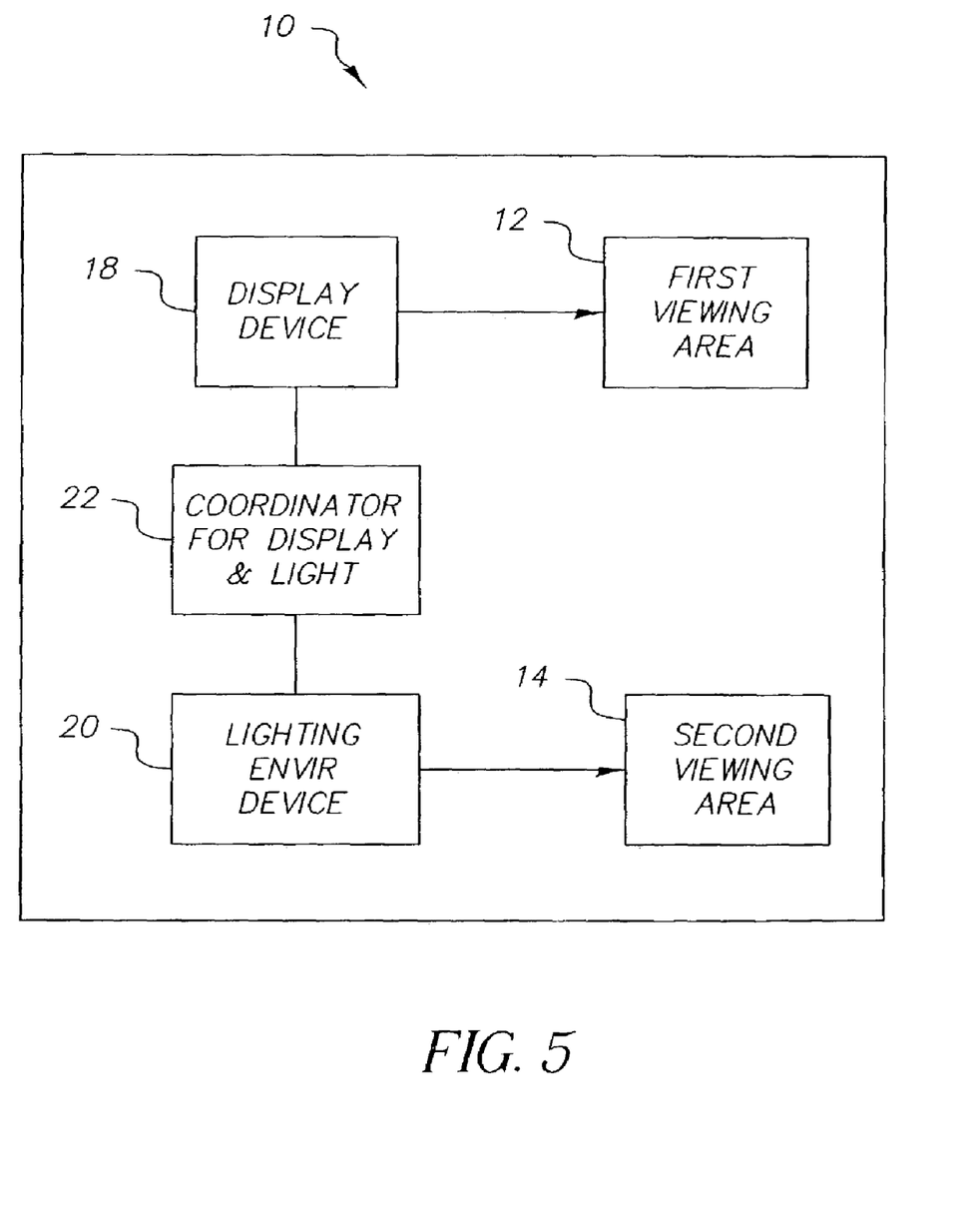
FIG. 5 shows features of the immersive image viewing system in accordance with the present invention.

FIG. 5 generally illustrates features of immersive image viewing system 10 in accordance with the present invention. As illustrated, viewing system 10 comprises display device 18 for displaying a scene on first viewing area 12, wherein the scene is comprised of at least one image. Means 20 are provided for displaying and modifying the lighting environment on second viewing area 14 wherein second viewing area 14 differs from first viewing area 12. Means 22 are provided for coordinating the displaying of the scene and the lighting environment on first and second viewing areas 12, 14, respectively, within immersive viewing environment 16 to generate an immersive viewing scene.

Figure 6:
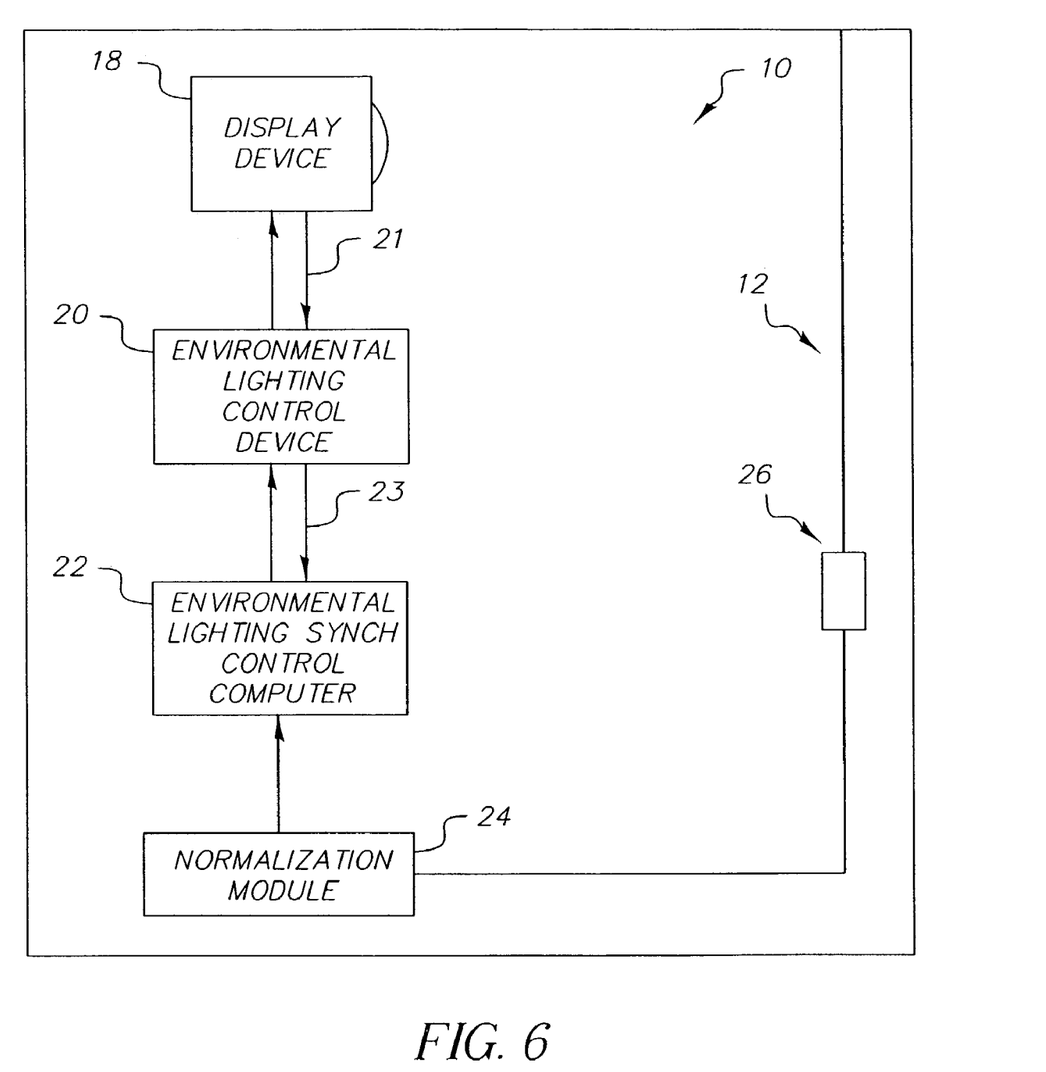
FIG. 6 shows features of the immersive image viewing system in accordance with the present invention.

Referring now to FIG. 6 there is shown a typical viewing environment 16 comprising display device 18 intended for displaying a scene on first viewing area 12. Viewing environment 16 further includes control device 20 for controlling the lighting environment, and coordinating means 22, such as a computer. In a preferred arrangement, the second viewing area 14 are emissive and constructed from a variety of lighting means, such as organic light emitting diodes (OLED) panels, LCD panels, translucent panels illuminated by a plurality of illumination methods such as bulbs or other traditional lighting sources. These panels can be reflective, transmissive, or a combination. During a typical viewing experience, display device 18 projects a scene/image onto first viewing area 12, and simultaneously transmits lighting and synchronization signals for second viewing area 14 to control device 20 by means of communication/electrical network 21. For additional control, control device 20 further communicates with coordinating means 22 by means of communication/electrical network 23. Viewing environment 16 is preferably normalized so that standard content projected by display device 18 is viewed similarly from all locations within the viewing environment. Therefore, a normalization module 24 is provided comprising stored data relating to the viewing environment size/shape. One or more environment sensors 26 can be disposed at particular locations within viewing environment 16, preferably at least one disposed proximate first viewing area 12, for monitoring the lighting conditions on first viewing area 12 and/or second viewing area 14 (i.e., the lighting environment). Such sensors 26 can be CCD or CMOS array sensors or CdS photocells. Output from sensors 26 is transmitted to coordinating means 22. The data stored by normalization module 24 and signals from sensors 26 communicate normalization information from module 24 and calibration data from sensor 26 to coordinating means 22. Coordinating means 22 transmits correction data from control device 20 and display device 18 over communication/electrical networks 21, 23. By this method, a constant calibration and normalization process occurs, providing for a consistent viewing experience for each viewer, regardless of the shape/size/configuration of viewing environment 16. That is, the system of the present invention operates as a feedback/self-monitoring playback system. The signals can be monitored/modified/adjusted/calibrated to provide an optimum viewing experience. Corrections made between sensed values and actual values can be accomplished by coordinating means 22. Such values can be compared with a stored master value (i.e., a reference model) to further optimize the viewing experience. The results of the comparison would then go to an environment specific computing subsystem capable of converting the comparison information into inputs appropriate to the lighting device control system that provides means 20 of physically affecting the lighting environment.

It is noted that the master value is intended to be the value for an individual moment in time. The lighting environment for a particular moment in the display is compared to the master value for that same moment, that moment being defined by a timecode standard of preference. Because the moment is constantly past, a deviation from the master value by the system is best identified by performing a test before or after a show/display, such a test constituting effects displayed long enough to allow the feedback system to optimize the display equipment in the theater. In addition or alternatively, an algorithm may extract deviation information during a show and calculate and implement on-the-fly changes to the display system to optimize the show in an incremental and constant manner.

It is also noted that if display device 18 is a projector operating in a reflective mode, it can project a scene/image on first viewing area 12 as well as displaying the lighting environment on second viewing area 14. Though, it may be preferred a plurality of emissive panels be employed to display the lighting environment, and as such, would be separate and distinct from display device 18.

The system of the present invention provides for changing the lighting environment for a presentation such as, but not limited to, a theatrical, film, video or computer generated presentation. The change in lighting changes the appearance of the viewing environment in which the presentation is situated. As described above, the lighting environment can be affected by employing emissive photonic sources, reflective screens, and/or transmissive screens. The sources being monochrome, red, green, blue, planar, or non-planar.

The lighting environment can be accomplished by employing one or more light sources as part of second viewing area 14. More particularly, second viewing area 14 can include light sources directly or indirectly (suspension or the like) attached to a wall, column, or other structural element of the viewing environment. Alternatively, the light sources would not be attached, but rather, positioned in a stable fashion either on a separate structure or a process of stabilization (such as blowing air or other mechanism—magnetics, electrostatics, or the like.) Still further, the light sources can be worn by the viewer in the form of cylinders or other open-ended 3D shape (boxes, or the like) around the eyes, the interiors of said open-ended cylinders being some form of light emissive or transmissive or reflective surface working in conjunction with an actively emissive light source.

The reference model employed for the feedback can be captured or created using methods known to those skilled in the art. For example, the reference model can be captured/created using automatic, semi-automatic, or manual methods.

Using an automatic method, the model can be captured as a $4pi^2$ steradian environmental lightfield converted to a map of a fixed number of cells by converting color, intensity and other values associated with each vector in the lightfield with a cell of the map for later reproduction in the theatrical space.

In a semi-automatic method, the lightfield may be selected from a group of lightfields typical of an environment (such as 5 feet below the surface of the Caribbean sea on a sunny day) and then imported into a computer program where the lightfield may be altered by an individual or a computer program (for example, making the day slightly cloudier or the water slightly turbid) directly or by combining the qualities of two or more different lightfields. Such a method might be especially appealing for altering a viewing environment in response not only to the prerecorded content, but in response to changes occurring in the viewing environment (as in the case of an outdoor or stadium viewing venue) by manual chance or by an algorithm. An example of such an algorithm would be to respond to stadium viewing by having the lighting environment respond to audience actions, such as applause; by displaying images suggestive of a surf rolling on a beach; or changes by the performance (where a real-time broadcast would be visually analyzed on the fly and the lighting control track generated in close temporal proximity to the analysis), and changes to the environment such as the sky getting cloudy and resulting in altering the color of the lighting to better harmonize with the colors in the sky.

In a manual method, static or dynamic lighting simulations can be created without reference to a captured lightfield. They could be manually generated using software similar to that used currently used to create 3-dimensional computer environments, for example, 3D Studio Max by Kinetix/Discrete, Maya, and the like.

The projection system in accordance with the present invention ameliorates/enhances the immersiveness of an image viewed by an observer without significant increased cost/complexity of the capture-to-delivery infrastructure. The present invention employs the surrounding environment to ameliorate the effects of existing display technologies (e.g., fixed width to height ratio, rectangular screen) without duplicating the panoramic display technologies (i.e., IMAX).

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 immersive image viewing system
12 first viewing area
14 second viewing area
16 immersive viewing environment
18 display device
20 control device; means for displaying and modifying a lighting environment
21 communication/electrical network
22 means for coordinating
23 communication/electrical network
24 normalization module
26 sensors

What is claimed is:

1. An image viewing system, comprising:
a display device for displaying a scene on a first viewing area, the scene comprised of at least one image and having image content;
means for displaying and modifying a lighting environment on a second viewing area separate from the first viewing area and which is not spatially coincident with the first viewing area, the first and second viewing areas defining an immersive viewing environment for an observer for viewing the scene, wherein the lighting environment does not have image content; and
means for coordinating the displaying of the scene and the lighting environment on the first and second viewing areas, respectively, within the immersive viewing environment wherein the lighting environment enhances the coordinated displayed scene to generate an immersive viewing scene.

2. The system of claim 1, wherein the display device is projector.

3. The system of claim 1, wherein the display device comprises a projector and a reflective screen.

4. The system of claim 1, wherein the display device is an emissive display.

5. The system of claim 1, wherein the means for coordinating is a computer.

6. The system of claim 1, wherein the first viewing area is stationary.

7. The system of claim 1, wherein the second viewing area is stationary.

8. The system of claim 1, wherein the second viewing area is comprised of a plurality of stationary viewing sections.

9. The system of claim 1, wherein the second viewing area comprises a structure worn by the observer.

10. The system of claim 1, wherein the lighting environment comprises a plurality of emissive light sources.

11. The system of claim 1, wherein the lighting environment comprises a plurality of reflective surfaces that are illuminated by projected light sources.

12. The system of claim 1, wherein the scene displayed on the first viewing area has a resolution higher than the lighting environment displayed on the second viewing area.

13. The system of claim 1, further comprising at least one sensor disposed in the viewing environment.

14. A method of generating a viewing environment, comprising the steps of:

displaying a scene on a first viewing area, the scene comprised of at least one image and having image content;

displaying a lighting environment on a second viewing area separate from the first viewing area and which is not spatially coincident with the first viewing area, the first and second viewing areas defining the immersive viewing environment for an observer for viewing the scene, wherein the lighting environment does not having image content; and coordinating the simultaneous displaying of the scene and the lighting environment on the first and second viewing areas, respectively, within the immersive viewing environment such that the lighting environment enhances the coordinated displayed scene to generate an immersive viewing scene.

* * * * *